US008888042B2

(12) United States Patent
Werjefelt

(10) Patent No.: US 8,888,042 B2
(45) Date of Patent: Nov. 18, 2014

(54) EMERGENCY VISION APPARATUS

(76) Inventor: Bertil R. L. Werjefelt, Kaneohe, HI (US)

( * ) Notice: Subject to any disclaimer, the term of this patent is extended or adjusted under 35 U.S.C. 154(b) by 1449 days.

(21) Appl. No.: 12/149,623

(22) Filed: May 6, 2008

(65) Prior Publication Data
US 2009/0279196 A1 Nov. 12, 2009

(51) Int. Cl.
B64D 25/00 (2006.01)
B64D 11/00 (2006.01)
B64C 1/14 (2006.01)
G02B 27/00 (2006.01)
B64D 43/00 (2006.01)

(52) U.S. Cl.
CPC .............. B64D 25/00 (2013.01); B64D 43/00 (2013.01)
USPC .................... 244/118.5; 244/121; 359/894

(58) Field of Classification Search
USPC .......... 244/118.5, 121, 129.1, 129.2; 359/895, 359/894; 348/160, 158, 117; 396/341, 267
See application file for complete search history.

(56) References Cited

U.S. PATENT DOCUMENTS

| 2,256,133 | A | | 9/1941 | Barnes |
| 2,730,921 | A | | 1/1956 | Little |
| 3,205,303 | A | | 9/1965 | Bradley |
| 3,216,778 | A | | 11/1965 | Davies et al. |
| 3,495,517 | A | | 2/1970 | Sweet |
| 3,744,874 | A | | 7/1973 | McCarthy et al. |
| 3,804,527 | A | | 4/1974 | Baughn et al. |
| 3,808,621 | A | | 5/1974 | French |
| 3,838,434 | A | * | 9/1974 | Hughes et al. ................. 396/27 |
| 3,916,094 | A | | 10/1975 | Marrone |
| 3,945,716 | A | | 3/1976 | Kinder |
| 3,990,778 | A | | 11/1976 | Magee et al. |
| 4,015,115 | A | | 3/1977 | Corcoran |
| 4,261,204 | A | | 4/1981 | Donaldson |
| 4,310,849 | A | | 1/1982 | Glass |
| 4,330,169 | A | | 5/1982 | Kantor |
| 4,465,347 | A | | 8/1984 | Task et al. |
| RE32,213 | E | | 7/1986 | Brown |
| 4,832,287 | A | | 5/1989 | Werjefelt |
| 4,863,130 | A | | 9/1989 | Marks, Jr. |
| 4,878,046 | A | | 10/1989 | Smith |

(Continued)

FOREIGN PATENT DOCUMENTS

| EP | 1 121 959 A1 | 8/2001 |
| WO | WO 99 43242 A1 | 9/1999 |
| WO | WO 00/28281 A1 | 5/2000 |
| WO | WO 2009/082480 A1 | 7/2009 |

Primary Examiner — Tien Dinh
Assistant Examiner — Richard R Green
(74) Attorney, Agent, or Firm — Shlesinger, Arkwright & Garvey LLP

(57) ABSTRACT

An emergency vision apparatus for providing an operator in a station visual access to information during a vision-obscuring emergency, comprises an expandable first enclosure filled with clear air, the first enclosure having front and rear transparent panels to allow an operator visual access through the first enclosure to a first source of information disposed in front of the front panel; an expandable second enclosure filled with clear air, the second enclosure having a rear panel and a transparent front panel for being disposed in proximity to a second source of information; a first camera disposed at the rear panel of the second enclosure, the camera being directed toward the front panel to image the second source of information through the second enclosure front panel; and a first display operably connected to the camera, the display being operably associated with the first enclosure to be visible to the operator through the first enclosure rear panel.

24 Claims, 8 Drawing Sheets

(56) References Cited

U.S. PATENT DOCUMENTS

| | | | |
|---|---|---|---|
| 4,887,987 A * | 12/1989 | Kato | 441/96 |
| 5,113,177 A | 5/1992 | Cohen | |
| 5,140,351 A | 8/1992 | Garcia et al. | |
| 5,202,796 A | 4/1993 | Werjefelt | |
| 5,246,193 A | 9/1993 | Faidley | |
| 5,318,250 A | 6/1994 | Werjefelt | |
| 5,420,828 A | 5/1995 | Geiger | |
| 5,602,948 A | 2/1997 | Currie | |
| 5,649,251 A * | 7/1997 | Suzuki et al. | 396/341 |
| 5,947,415 A | 9/1999 | Werjefelt | |
| 6,082,673 A | 7/2000 | Werjefelt | |
| 6,191,899 B1 * | 2/2001 | Fuchs | 359/894 |
| 6,297,749 B1 | 10/2001 | Smith | |
| 6,460,804 B2 | 10/2002 | Werjefelt | |
| 6,567,220 B2 | 5/2003 | McDonald et al. | |
| 6,675,800 B2 | 1/2004 | Keller | |
| 6,710,298 B2 | 3/2004 | Eriksson | |
| 6,714,141 B2 | 3/2004 | Kennedy | |
| 7,180,476 B1 | 2/2007 | Guell et al. | |
| 2003/0002164 A1 | 1/2003 | McDonald | |
| 2003/0201911 A1 * | 10/2003 | Kennedy | 340/980 |
| 2004/0179149 A1 * | 9/2004 | Wang-Lee | 349/58 |
| 2005/0117052 A1 | 6/2005 | Willes | |
| 2006/0145003 A1 | 7/2006 | Bardel et al. | |
| 2006/0209441 A1 * | 9/2006 | Werjefelt | 359/894 |

* cited by examiner

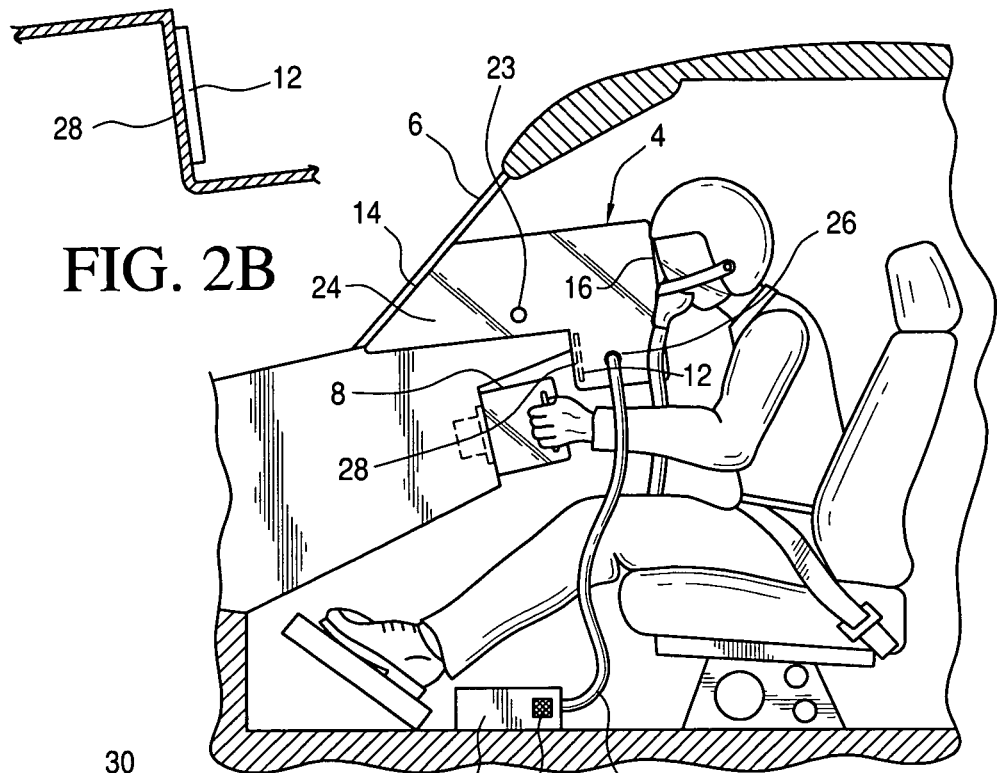
FIG. 2B
FIG. 2A
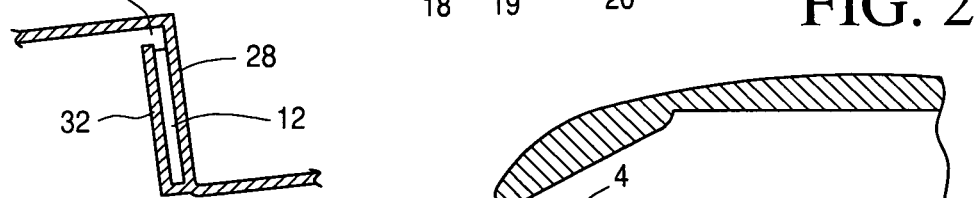
FIG. 2C
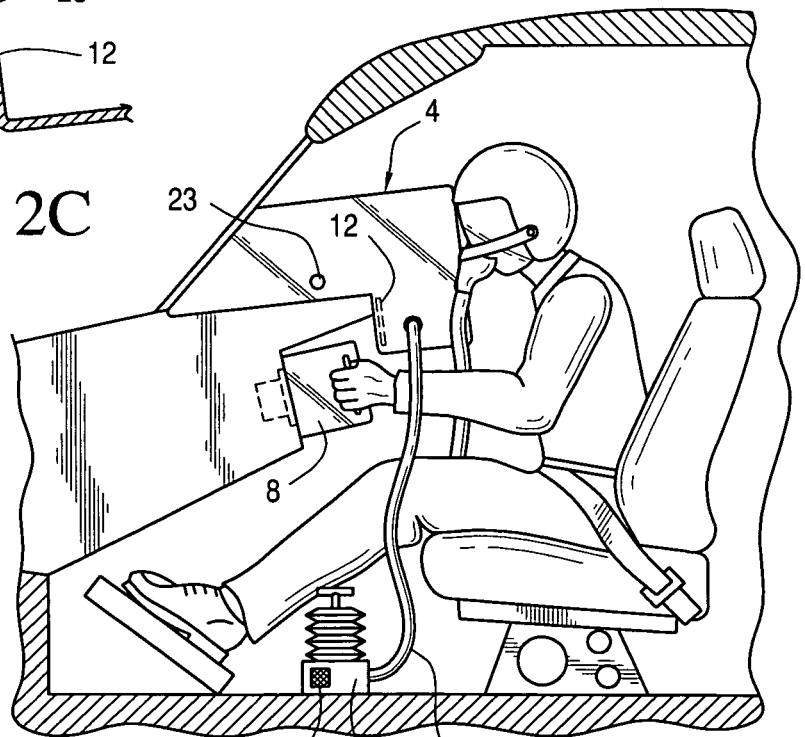
FIG. 3

US 8,888,042 B2

EMERGENCY VISION APPARATUS

FIELD OF THE INVENTION

The present invention is generally directed to an apparatus to enable an operator to maintain visual contact with instruments or other visual sources of data after vision-obscuring matter, such as smoke and/or particulate matter from a fire, has invaded the operator's environment. In particular, the present invention relates to a system that provides a clear view outside the windshield and of the instrument panel in an aircraft cockpit, thereby providing the pilot with vital information for guiding the aircraft to a safe landing after such as smoke or other vision-obscuring matter, invades the cockpit area.

BACKGROUND OF THE INVENTION

The present invention is related to U.S. Pat. Nos. 4,832,287; 5,318,250; 5,202,796; 5,947,415; 6,082,673 and 6,460,804.

Prior art emergency vision assurance systems use inflatable enclosures with viewing panels at opposite ends of the enclosures to gap the distance between the pilot's face mask and the windshield or the instrument panel to allow the pilot access to visual information to help him operate an aircraft in the event of a smoke generating emergency in the cockpit.

SUMMARY OF THE INVENTION

The present invention provides an emergency vision apparatus for providing an operator in a station visual access to information during a vision-obscuring emergency, comprising an expandable first enclosure filled with clear air, the first enclosure having front and rear transparent panels to allow an operator visual access through the first enclosure to a first source of information disposed in front of the front panel; an expandable second enclosure filled with clear air, the second enclosure having a rear panel and a transparent front panel for being disposed in proximity to a second source of information; a first camera disposed at the rear panel of the second enclosure, the camera being directed toward the front panel to image the second source of information through the second enclosure front panel; and a first display operably connected to the camera, the display being operably associated with the first enclosure to be visible to the operator through the first enclosure rear panel.

The present invention also provides an emergency vision apparatus for providing an aircraft pilot in a cockpit visual access to information during a vision-obscuring emergency, comprising an expandable first enclosure filled with clear air, the first enclosure having front and rear transparent panels to allow a pilot visual access through the first enclosure to the outside of a cockpit through a windshield; a display operably associated with the first enclosure to be visible to the operator through the first enclosure rear panel; and means for providing flight information input to the display.

BRIEF DESCRIPTIONS OF THE DRAWINGS

FIG. 2A is a side elevational view of FIG. 1.

FIG. 2B is an enlarged fragmentary cross-sectional view taken from FIG. 2A, showing the placement of a display inside an inflatable enclosure.

FIG. 2C is an enlarged fragmentary cross-sectional view taken from FIG. 2A, showing the placement of a display outside the inflatable enclosure.

FIG. 3 is side elevational view of FIG. 1, showing a manual pump for inflating the inflatable enclosure.

DETAILED DESCRIPTION OF THE INVENTION

Figure 1:
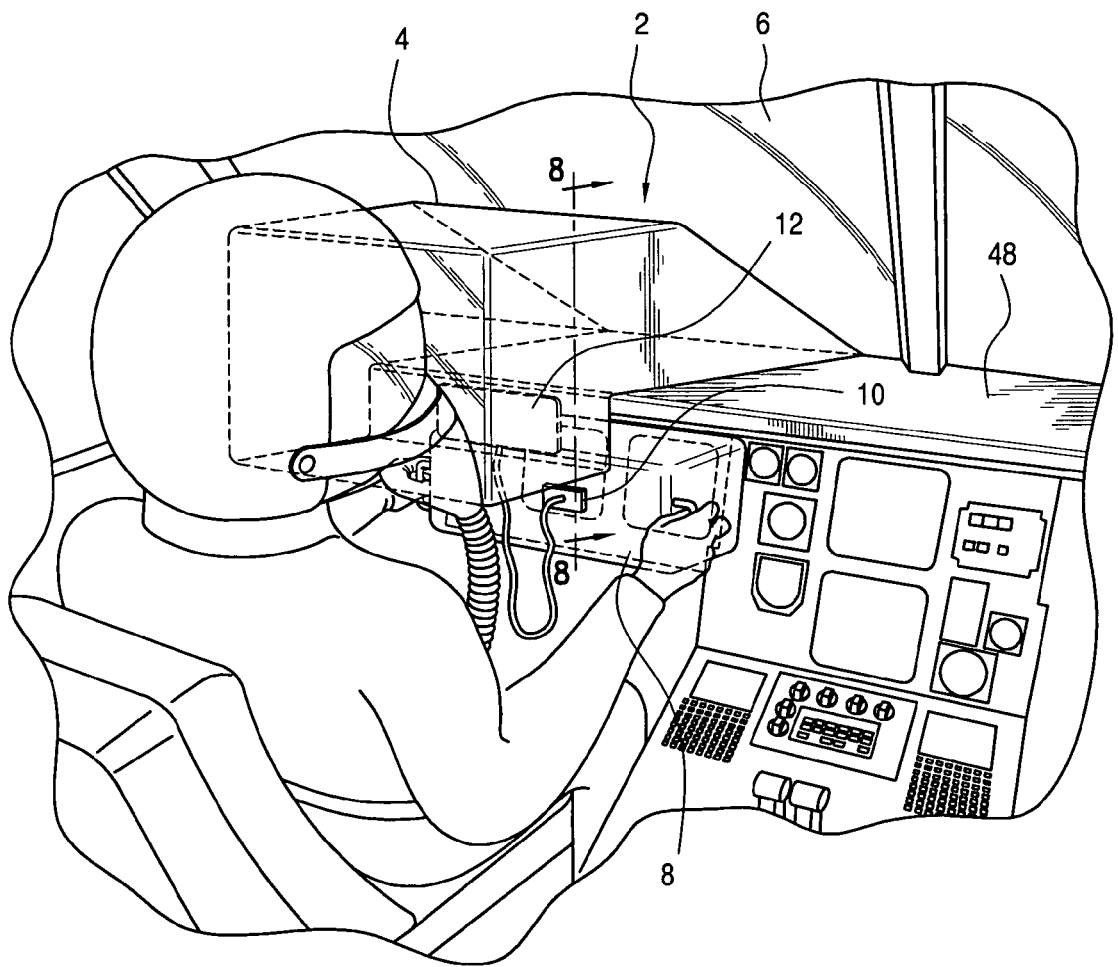
FIG. 1 is a rear perspective view of an aircraft cockpit, showing an embodiment of the present invention in use by a pilot during a vision-obscuring emergency.

An embodiment of an emergency vision apparatus 2 made in accordance with the present invention is disclosed in FIG. 1. Although the apparatus is shown in the context of an aircraft cockpit, the invention can be used in other similar environments where an operator in a station requires access to information from a source, such as an instrument panel, during a vision-obscuring emergency, such as a smoke generating event. Examples of operator stations are a submarine control station, a nuclear power plant control room or any other critical environments where the need exists for an operator to continue to operate in case of a vision-obscuring emergency, such as when smoke or other particulate matter invades the operator station and obliterates the visibility between the operator and the control panel. Accordingly, where the instrument, control panel or critical sources of information is disposed in an operator station, the operator must have visual access to the information in case a vision-obscuring event occurs in the operator station.

The apparatus 2 includes an inflatable enclosure 4 for allowing the pilot to see through the windshield 6 during a vision-obscuring emergency, such as when the cockpit fills up with sight obscuring smoke. The apparatus 2 also includes an expandable enclosure 8 to allow the pilot to see the instrument panel by means of a camera 10 connected to a display 12, such as a LCD or the like. Both the inflatable enclosure 4 and the expandable enclosure 8 are made of an airtight fabric, such as ripstop Nylon or other flexible, pliable material so that they can be folded into a compact configuration when not in use.

Referring to FIG. 2, the inflatable enclosure 4 has a front panel 14 appropriately substantially shaped to conform to the curvature of the inner surface of the windshield 6. The front panel 14 is made of a transparent plastic material. The inflatable enclosure 4 has a rear panel 16 also made of a transparent plastic material so that the pilot can see through the interior of the inflatable enclosure 4, and past the front panel 14 and the windshield 6 during a vision-obscuring emergency. The inflatable enclosure 4 may be inflated by a battery powered blower 18 equipped with an appropriate filter 19 so that air drawn from the cockpit is advantageously filtered of particulate matter to provide clear air within the inflatable enclosure 4. An air hose 20 is operably connected to the blower 18 and the interior of the inflatable enclosure 4. The inflatable enclosure 4 may also be equipped with a manual air pump 22 with a filter 21 to maintain the pressure within the enclosure in case the power to the blower 18 is disrupted or exhausted, as shown in FIG. 3. The manual pump 22 may also be used as the primary supplier of clear air for inflating the enclosure 4.

The inflatable enclosure 4 is advantageously loosely inflated such that it will substantially conform to and seal against the windshield 6 so as to exclude smoke or other vision-obscuring matter from the pilot's line of sight and thereby allow the pilot visual access through the windshield. A relief valve 23 allows the pressure within the inflatable enclosure 4 to be regulated and allows the enclosure to substantially conform to and seal over the irregularities on the surfaces to which it is pressed so as to displace any vision-impairing matter on such surfaces. The relief valve 23 provides slow leakage of the inflating filtered air to regulate the air pressure within the enclosure 4.

Referring back to FIG. 2, the inflatable enclosure 4 is L-shaped with a horizontal portion 24 and a vertical portion 26. The vertical portion 26 is advantageously sized so as not to interfere with the manipulation of the yoke through all its necessary movements. The display 12 is disposed at the front end portion of the vertical portion 26. The display 12 may be installed inside the inflatable enclosure 4, as shown in FIG. 2B, or outside, as shown in FIG. 2C. For the outside installation of the display 12, a front panel 28 of the vertical portion 26 is made of a transparent plastic material. A pocket 30 is formed between the front panel 28 and another panel 32 to support the display 12 outside the inflatable enclosure 4. For the inside installation, the display 12 is attached by conventional means to an inside surface of the front panel 28, as shown in FIG. 2B.

Figure 4:
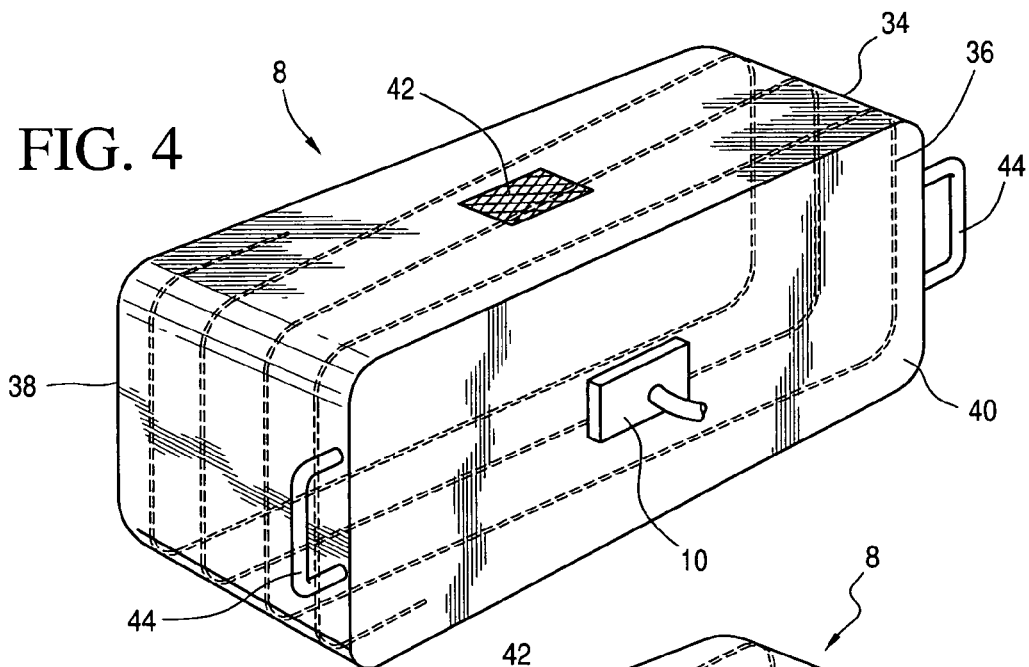
FIG. 4 is a rear perspective view of an expandable enclosure used in the apparatus of FIG. 1, shown in an expanded and deployed configuration for placement over the instrument panel.
Figure 5:
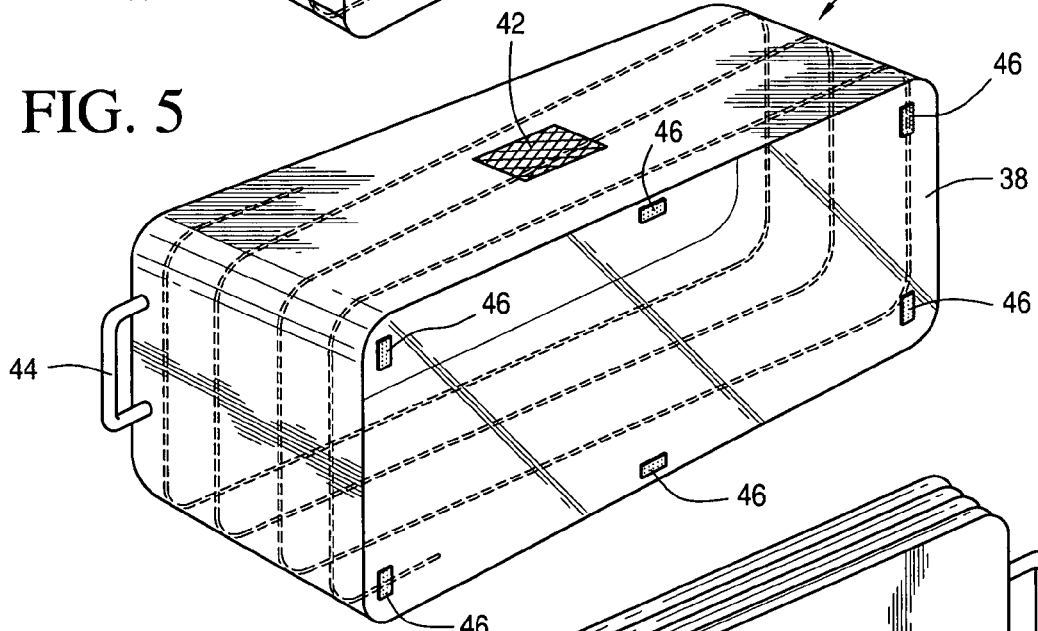
FIG. 5 is a front perspective of the expandable enclosure of FIG. 4.
Figure 6:
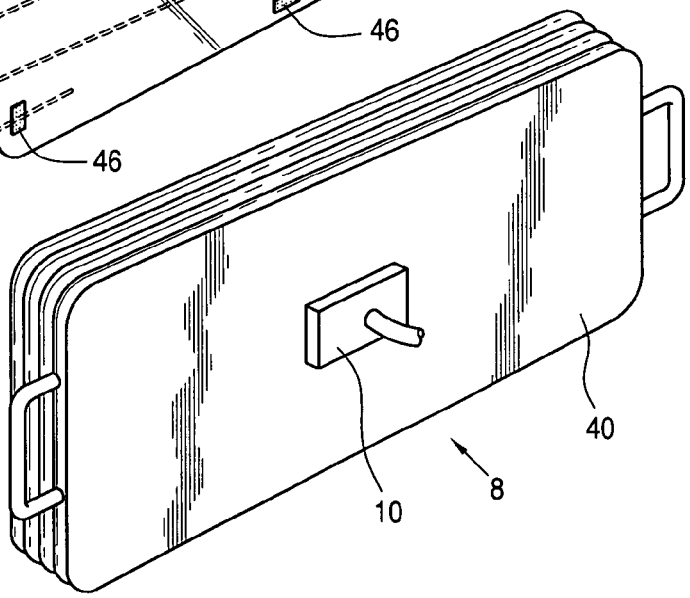
FIG. 6 is a rear perspective view of the enclosure of FIG. 4, shown in a collapsed compact configuration for stowage.

Referring to FIGS. 4, 5 and 6, the enclosure 8 includes a pliable sidewall 34 supported by a coil spring 36. The sidewall 34 encloses front and rear panels 38 and 40 to provide a sealed interior volume. The spring 36 allows the enclosure 8 to be compressed and deflated to a compact configuration when not in use, as shown in FIG. 6. The spring 36 is biased to force the enclosure 8 into an expanded position, shown in FIGS. 4 and 5. When the enclosure 8 is allowed to expand from the action of the spring 36, air from the cockpit is drawn through a filter 42, which is in communication with the interior of the enclosure, thereby filling the interior volume of the enclosure 8 with clear air. The filter 42 is designed to filter smoke or other particulate matter in the air to provide clear air within the enclosure 8. The enclosure 8 includes handle straps 44 to allow the pilot to conveniently move the enclosure 8 to different portions of the instrument panel as needed (see FIG. 7). Fasteners 46 are used to secure the enclosure 8 to the instrument panel. The fasteners 46 may be made of hook-and-loop fasteners, such as Velcro (trademark), or other standard fastener devices. The transparent front panel 38 is made of pliable material to allow it to conform to the irregularities on the front face of the instrument panel. The camera 10 is secured to the rear panel 40. The camera 10 has a field of view that substantially encompasses the width and height of the enclosure 8. Images picked up by the camera 10 are transmitted to the display 12 for viewing by the pilot.

Referring back to FIG. 1, the apparatus 2 is used during a vision-obscuring emergency, such as a smoke emergency, in an aircraft cockpit to provide the pilot access to essential visual information to the operation and landing of the aircraft. The inflatable enclosure 4 is taken from its stowage and inflated by the electric blower 18 or the manual pump 22, as the need dictates. The blower 18 or pump 22 is equipped with a filter to filter the smoke particles from the cockpit before being allowed inside the inflatable enclosure 4, so that clear air fills out the enclosure. The inflatable enclosure 4 is supported on the glare shield 48 and pushed against the windshield 6 such that the front panel 14 substantially conforms to or is placed in close proximity to the windshield 6. Smoke in the cockpit is, therefore, displaced by the inflatable enclosure 4, giving the pilot a clear line of sight between the rear panel 16 and the windshield 6.

The enclosure 8 is also released from its stowage, allowing the spring 36 to expand the volume of the enclosure 8. The expansion draws air from the cockpit through the filter 42 to fill the interior of the enclosure with clear air. The enclosure 8 is positioned over and against a desired portion of the instrument panel, thereby displacing smoke between the front panel 38 and the face of the instrument panel. The camera 10 is accordingly provided with a clear view of the instrument panel through the interior of the enclosure 8. The fasteners 46 are attached to corresponding fasteners on the instrument panel, allowing the enclosure 8 to be supported from the instrument panel. The camera 10 has a field of view that substantially encompasses the width and height of the enclosure 8. The camera 10 may be wirelessly connected to the display 12 by standard means, such as the Bluetooth (trademark) radio transmission technology, instead of being wired as shown.

Figure 7:
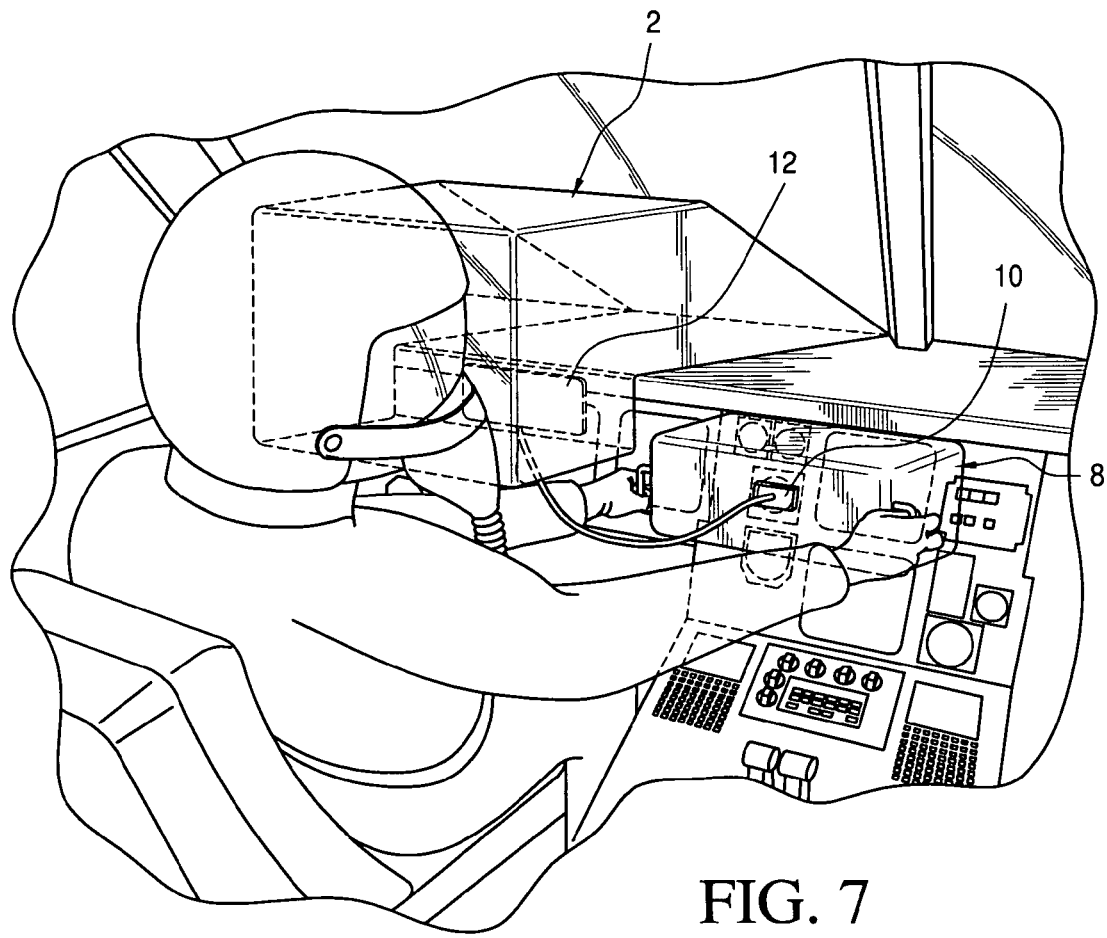
FIG. 7 is similar to FIG. 1, showing the pilot moving the expandable enclosure to a different position on the instrument panel.

The enclosure 8 may be shifted to different positions on the instrument panel, as shown in FIG. 7, to allow the pilot to see different sections of the instrument panel. The enclosure 8 may also be shifted to view the overhead panels, the center console and side panels to see and manipulate switches, circuit breakers, etc. as necessary. Accordingly, the enclosure 8 as it is shifted to different locations provides advantageous flexibility for the pilot to see the display or readings on the desired instruments and the status of any switches, circuit breakers, etc., that he may need to manipulate to operate the aircraft.

Figure 8:
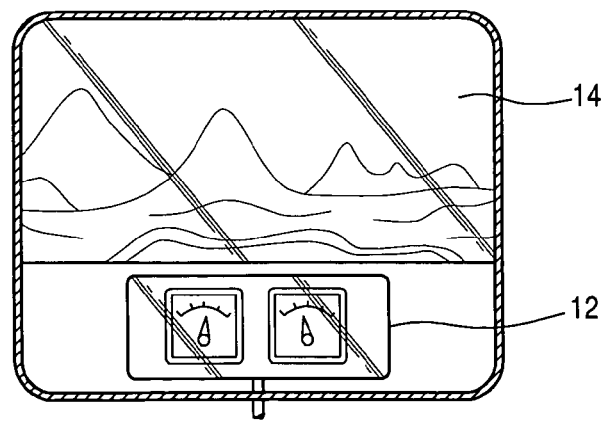
FIG. 8 is a cross-sectional view taken along line 8-8 in FIG. 1, showing images from outside the windshield and of the instrument panel.

FIG. 8 shows a view of the outside through the front panel 14 and the windshield 6. Also shown is the image on the display 12, showing a portion of the instrument panel. The pilot generally requires to see two sources of information to operate the aircraft. The first source of information is the view through the windshield that provides the pilot with topographic information, such as the terrain around an airport and along the flight route and other traffic. The second source of information is the instrument panel that provides the pilot with flight information, such as airspeed, altitude, attitude, heading, etc. The second source of information also includes the overhead panels, the center console and side panels where switches, circuit breakers, etc. are located that the pilot needs to see and manipulate as necessary.

Figure 9:
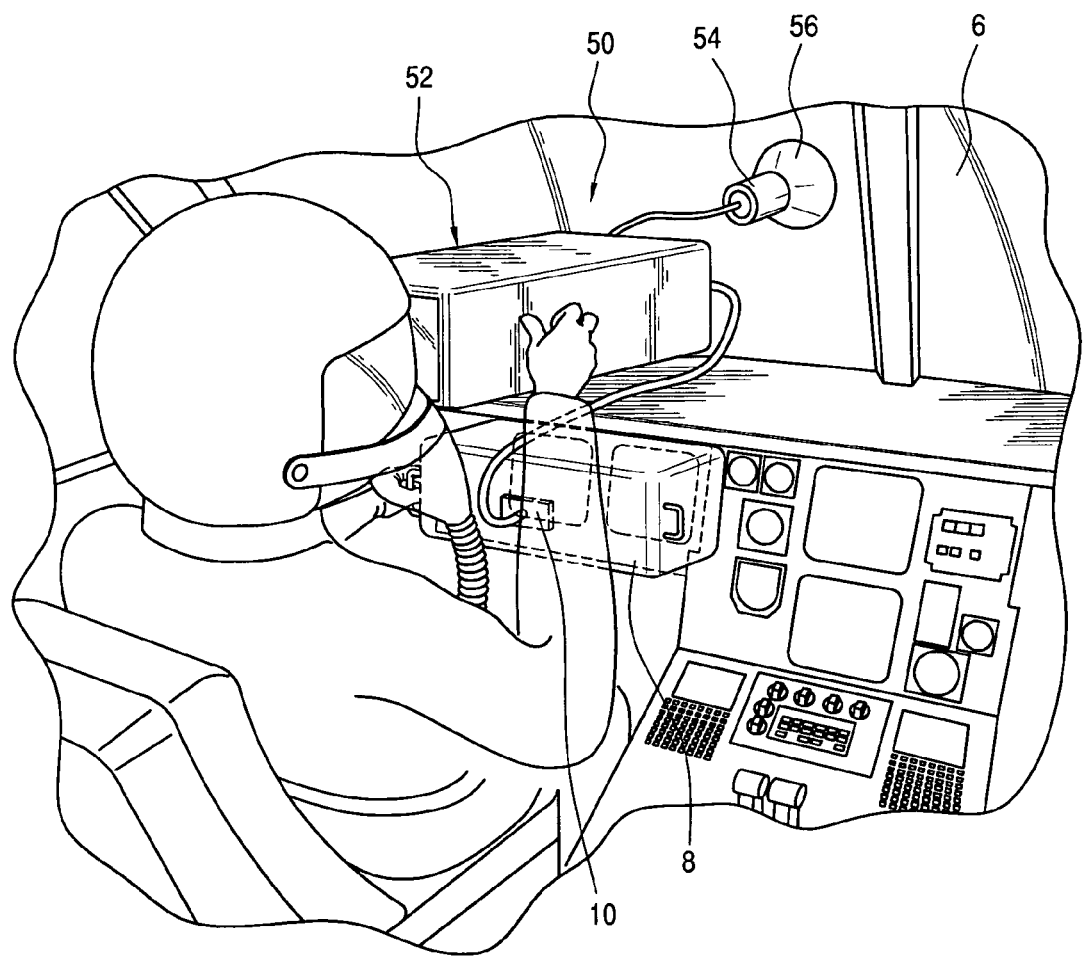
FIG. 9 is a rear perspective view of an aircraft cockpit, showing another embodiment of the present invention in use by a pilot.
Figure 10:
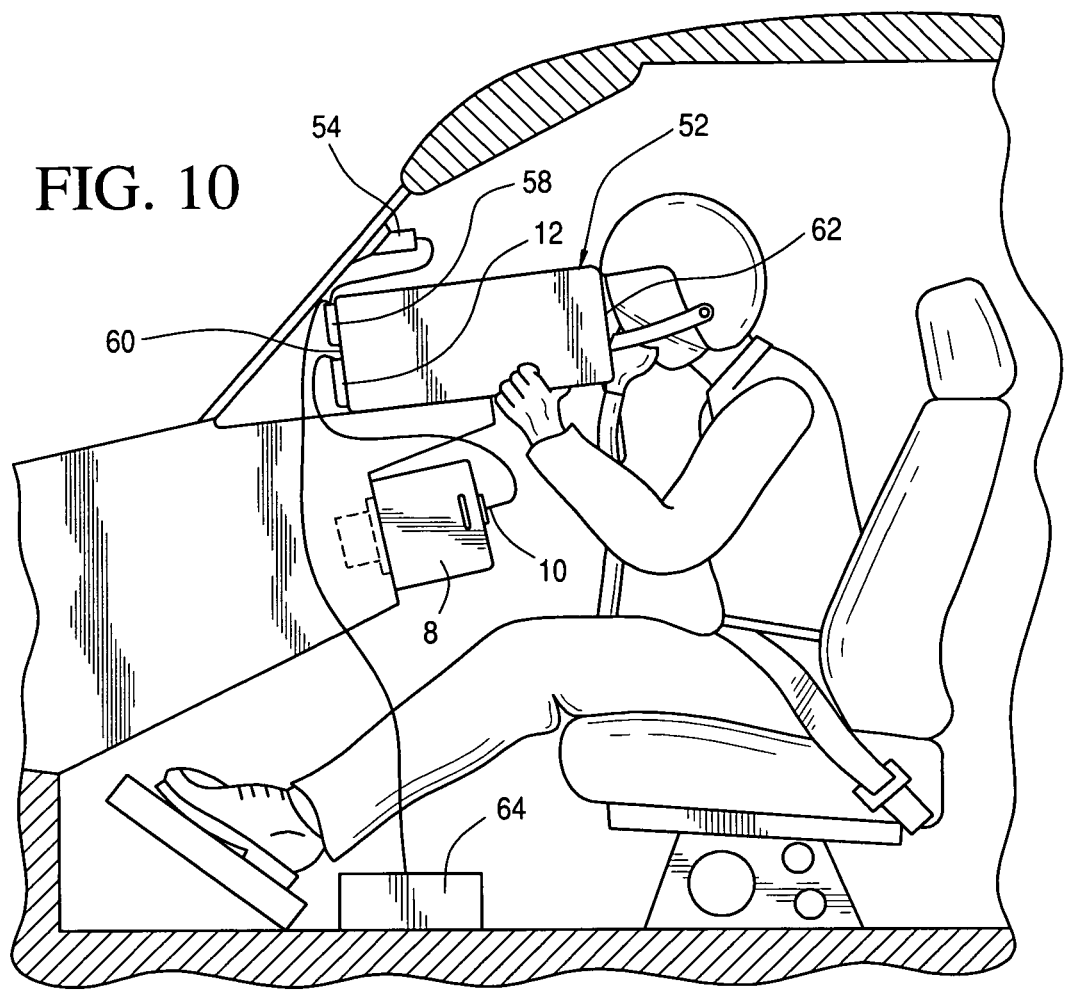
FIG. 10 is a side elevational view of FIG. 9.

Referring to FIGS. 9 and 10, another embodiment of an emergency vision apparatus 50 is disclosed. The apparatus 50 includes an expandable enclosure 52 used in conjunction with the expandable enclosure 8. A camera 54 is attached to the windshield 6 by standard means, such as a suction cup 56. The camera 54 is directed through the windshield 6 to image the outside environment. The camera 54 is operably connected to a display 58 which is viewable by the pilot through the expandable enclosure 52. The camera 10 which is attached to the expandable enclosure 8 is operably associated with the display 12, which is also viewable through the expandable enclosure 52.

Figure 11:
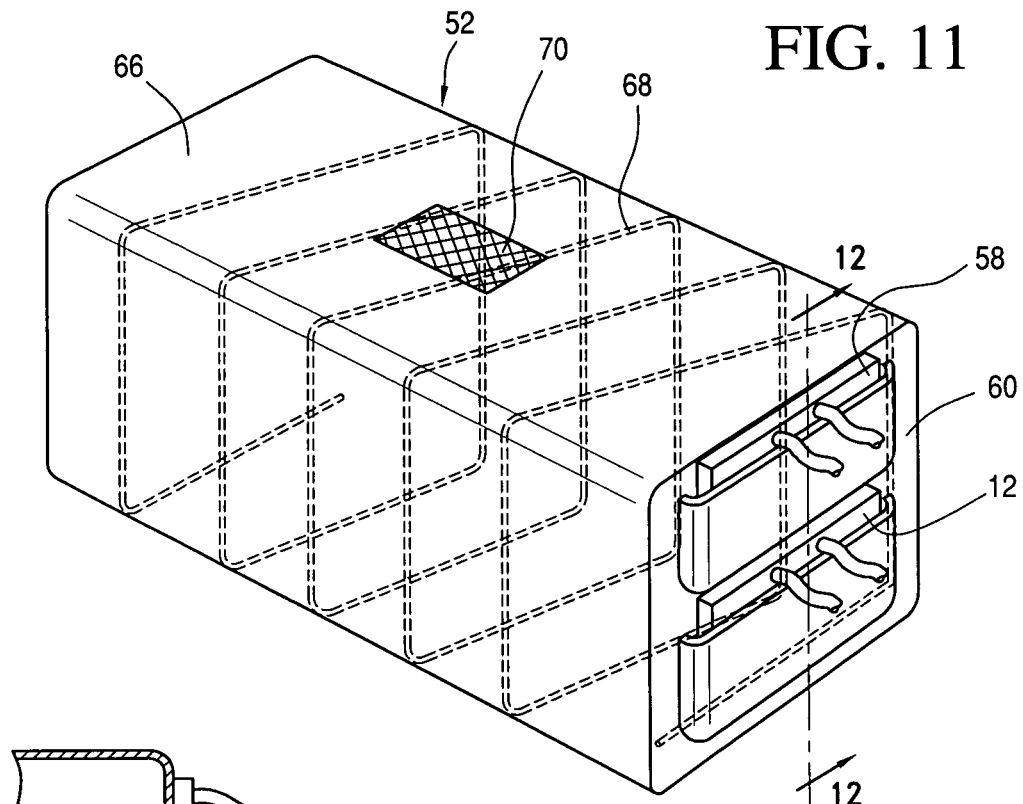
FIG. 11 is a front perspective view of an expandable enclosure of FIG. 9, showing two displays disposed at the front panel of the enclosure.
Figure 12:
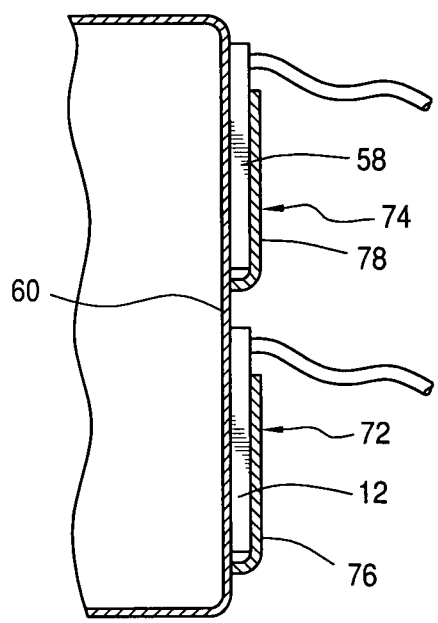
FIG. 12 is a fragmentary cross-sectional view taken along line 12-12 in FIG. 11.
Figure 13:
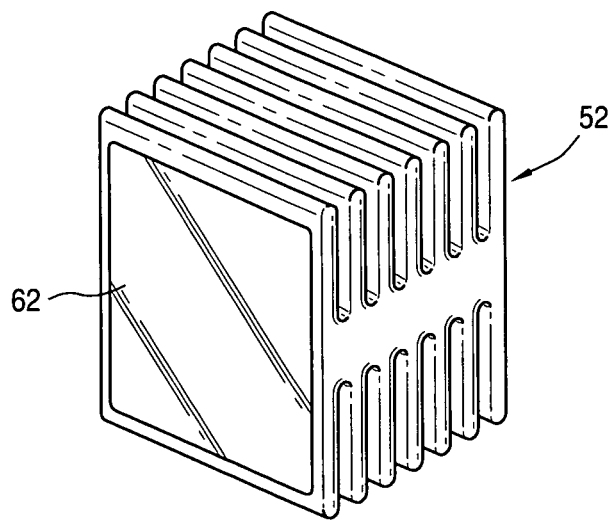
FIG. 13 is a rear perspective view of FIG. 11, showing the expandable enclosure in a collapsed, flattened, compact stowage configuration.

Referring to FIGS. 10-13, the expandable enclosure 52 has a front panel 60 and a rear panel 62, both of which are made of transparent plastic material. The displays 58 and 12 are powered from a battery pack 64. The enclosure 52 has pliable sidewall 66. A coil spring 68 attached to the sidewall 66 allows the enclosure 52 to expand from its compact stowage configuration, as best shown in FIG. 13, to its deployed configuration, as shown in FIGS. 10 and 11. A filter 70, which is in communication with the interior of the enclosure, filters the ambient air of smoke or any particulate matter so that clear air is drawn inside the enclosure 52 when it expands after being released from its flattened stowage configuration. The spring 68 is biased towards the expanded configuration of the enclosure 52. When the enclosure 52 is flattened to its stowage configuration, as shown in FIG. 13, the spring 68 is placed under compression, thereby to be ready to expand the enclosure to the deployed configuration when needed. Pockets 72 and 74 are provided at the front panel 60 to house the displays 12 and 58, respectively. Walls 76 and 78 are attached to the front panel 60 to form the respective pockets. The wall 78 may be made of transparent plastic material in case the display 58 malfunctions so that the display 58 may be removed from its pocket and allow the pilot to see through the windshield 6.

The camera 54 may be wirelessly connected to its associated display 58 by conventional means, such as the Bluetooth (trademark) radio transmission technology, instead of being wired as shown. The camera 10 may also be similarly wirelessly connected with its display 12, instead of being wired as shown. The displays 12 and 58 may be LCD type displays or the like.

Figure 14:
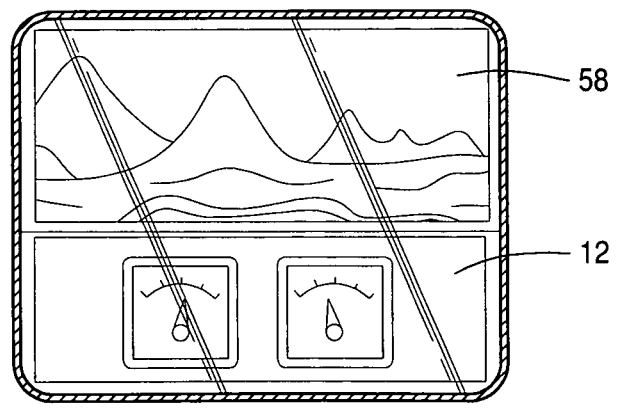
FIG. 14 is a view as seen by the pilot through the expandable enclosure of FIG. 10.

In use, the enclosure 52 is allowed to expand from the action of the spring 68 and then placed on the glare shield for support. The pilot looks through the rear panel 62 and views the images displayed on the displays 12 and 58 through the front panel 60, as best shown in FIG. 14. The camera 54 provides the image for the display 58 while the camera1 10 provides the image for the display 12. The enclosure 52 may be self-supported on the glare shield to free the pilot's hands. As in the other embodiment, the enclosure 8 may be positioned on any selected portion of the instrument panel. The enclosure 8 is supported by the fasteners 46 and the corresponding fasteners (not shown) on the instrument panel.

The camera 54 and the suction cup 56 may be pre-installed on the windshield 6, with the wire for connecting to the display 58 neatly stowed nearby. The enclosure 8 in its compact flattened configuration may also be pre-installed, for example underneath the glare shield with hook-and-loop fasteners. This arrangement advantageously reduces the time for setup during an emergency.

Figure 15:
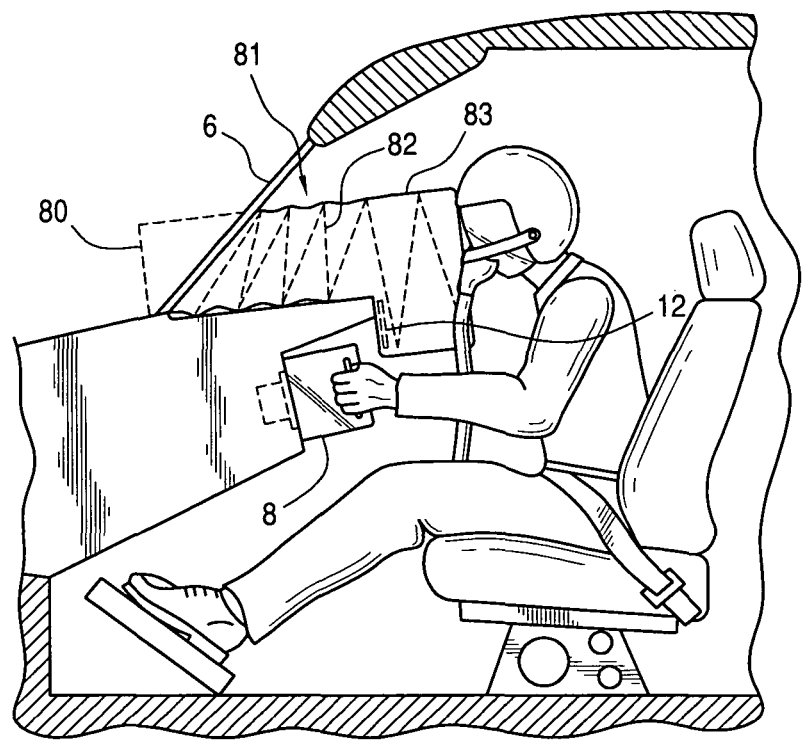
FIG. 15 is a side elevational view of another embodiment of the present invention.

Referring to FIG. 15, another embodiment of the present invention is an apparatus 81 similar to the apparatus 2. An expandable enclosure 83, similar to the inflatable enclosure 4 (shown in FIG. 1) is equipped with a coil spring 82 and a filter in the same manner as the filter 70 for the enclosure 52 shown in FIG. 11, thereby obviating the need for the air blower 18 or pump 22. The angled front panel 14 (shown in FIG. 2A) is squared off, generally indicated by the phantom lines at 80, but because of the flexibility provided by the spring 82, the squared off portion will substantially conform to the angle of the windshield 6 when pushed against it, as best shown in FIG. 15. Use of the embodiment shown in FIG. 15 is similar to the apparatus 2 shown in FIG. 1.

Figure 16:
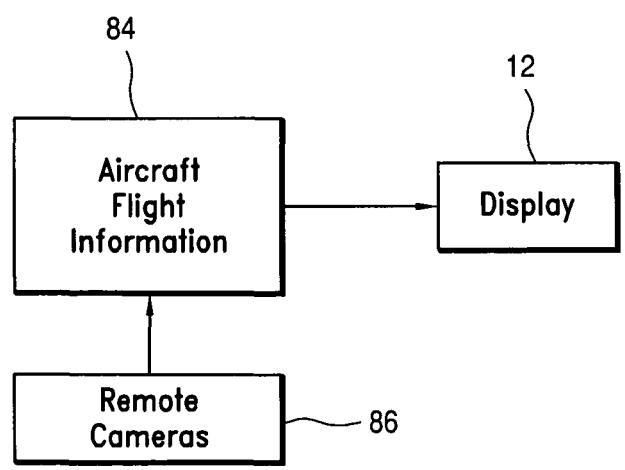
FIG. 16 is a functional block diagram, showing the aircraft flight information system connected to a display as used in the present invention.

Referring to FIG. 16, instead of using the inflatable enclosure 8 and the associated camera 10 to pick up data from the instrument panel, the display 12 may be directly connected to the aircraft information system 84. The system 84 may provide any desired information relating to the flight of the aircraft, such as airspeed, altitude, attitude, heading, vertical speed, navigation information, etc. The system 84 may be derived from the emergency instrumentation system of the aircraft or the primary flight display (PDF) panel. It should be understood that the system 84 and the enclosure 8/camera 10 arrangement are both means for providing the second source of information input to the display 12. Such information includes flight information, the status of switches, circuit breakers and other equipment. Further, the arrangement comprising the enclosure 8 and the camera 10 provides a movable means for providing input to the display 12. Remote cameras 86 installed throughout the aircraft to provide views of the wings, the cargo hold, the control surfaces, etc., may also be connected to the display 12 to provide additional sources of information to allow the pilot to operate the aircraft during an emergency.

The above-described embodiments of the present invention reduces, if not eliminates, the need to custom-fit each apparatus to the particular aircraft in which it will be used. The apparatus of the present invention is designed to be a "one-size fits all," providing a universal fit for a number of aircrafts. This substantially reduces the time to manufacture the apparatus, since the need to make specific measurements of each aircraft where the apparatus will be used and to obtain supplementary certification from the government body that regulates the industry would be substantially reduced.

It should be understood that the enclosure 4, the enclosure 83, or the arrangement comprising the enclosure 52, the camera 54 and the display 58 provide the means for providing visual access to the first source of information.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention.

I claim:

1. An emergency vision apparatus for providing an operator in a station visual access to information during a vision-obscuring emergency, comprising:

a) an expandable first enclosure filled with clear air, said first enclosure having front and rear transparent panels to allow an operator visual access through said first enclosure to a first source of information disposed in front of said front panel;

b) an expandable second enclosure filled with clear air, said second enclosure having a rear panel and a transparent front panel for being disposed in proximity to a second source of information;

c) a first camera disposed at said rear panel of said second enclosure, said camera being directed toward said front panel to image said second source of information through said second enclosure front panel; and d) a first display operably connected to said camera, said display being operably associated with said first enclosure to be visible to the operator through said first enclosure rear panel.

2. An apparatus as in claim 1, wherein:
a) each of said first and second enclosures has an expanded form and a compact stowed form; and
b) a filter operably associated with each of said first and second enclosures to filter the ambient atmosphere and fill the interior of said enclosure with clear air when said enclosure is expanded to said expanded form.

3. An apparatus as in claim 2, wherein said second enclosure includes a flexible support biased to expand said second enclosure to its expanded form and adapted to be collapsible when said second enclosure is collapsed to its compact stowed form.

4. An apparatus as in claim 2, wherein said first enclosure includes a flexible support biased to expand said first enclosure to its expanded form and adapted to be collapsible when said first enclosure is collapsed to its compact stowed form.

5. An apparatus as in claim 1, wherein said second enclosure is movable to selected parts of the second source of information.

6. An apparatus as in claim 1, wherein said second enclosure includes fasteners for removable attachment to the second source of information.

7. An apparatus as in claim 1, wherein said first enclosure is inflatable.

8. An apparatus as in claim 7, and further comprising a blower to inflate said first enclosure to said expanded form.

9. An apparatus as in claim 8, wherein said blower is electric.

10. An apparatus as in claim 7, and further comprising a manual air pump to inflate said first enclosure to said expanded form.

11. An apparatus as in claim 1, wherein said display is disposed within said first enclosure.

12. An apparatus as in claim 1, wherein:
a) said first enclosure includes a pocket; and
b) said first display is disposed within said pocket.

13. An apparatus as in claim 12, wherein:
a) said pocket includes first and second parallel walls; and
b) one of said first and second parallel walls is transparent thereby to make said first display visible to the operator through said first enclosure rear panel.

14. An apparatus as in claim 1, wherein:
a) said first enclosure is L-shaped having a horizontal portion and a vertical portion; and
b) said first display is associated with said vertical portion.

15. An apparatus as in claim 1, wherein said display is wirelessly connected to said camera.

16. An apparatus as in claim 1, and further comprising:
a) a second camera disposed in close proximity to a windshield, said second camera is directed to image an outside scene;
b) a second display operably connected to said second camera; and
c) said second display is disposed on said first enclosure front panel.

17. An apparatus as in claim 16, wherein:
a) said first enclosure front panel includes lower and upper pockets arranged vertically from each other;
b) said first display is disposed in said lower pocket; and
c) said second display is disposed in said upper pocket.

18. An apparatus as in claim 17, wherein said second display is wirelessly connected to said second camera.

19. An apparatus as in claim 16, and further comprising:
a) a suction cup for attachment to a windshield; and
b) said second camera is secured to said suction cup.

20. An apparatus as in claim 1, wherein said first enclosure front panel is angled to fit against a windshield.

21. An emergency vision apparatus for providing an operator in a station visual access to information during a vision-obscuring emergency, comprising:
a) means for providing visual access to an operator to a first source of information; and
b) movable means for providing input to said means for providing visual access to provide visual access to the operator to a second source of information.

22. An emergency vision apparatus for providing an aircraft pilot in a cockpit visual access to information during a vision-obscuring emergency, comprising:
a) an expandable enclosure filled with clear air, said enclosure having front and rear transparent panels to allow a pilot visual access through said enclosure to the outside of a cockpit through a windshield;
b) said enclosure is L-shaped having a horizontal portion disposed to provide visual access to the pilot through the windshield and a vertical portion; and
c) a display carried by said enclosure, said display is associated with said vertical portion, said display is visible to the pilot through said rear transparent panel; and
d) means for providing flight information input to said display.

23. An apparatus as in claim 22, wherein:
a) said vertical portion includes a pocket; and
b) said display is disposed in said pocket.

24. An apparatus as in claim 22, wherein said enclosure includes a flexible support biased to expand said enclosure to its expanded form and adapted to be collapsible when said enclosure is collapsed to its compact stowed form.

* * * * *